US010109208B2

(12) United States Patent
Cherepinsky et al.

(10) Patent No.: US 10,109,208 B2
(45) Date of Patent: Oct. 23, 2018

(54) LIDAR-BASED VEHICLE DISTANCE MEASUREMENT SYSTEM

(71) Applicant: Sikorsky Aircraft Corporation, Stratford, CT (US)

(72) Inventors: Igor Cherepinsky, Sandy Hook, CT (US); Jason C. Derenick, Newtown Square, PA (US); Joshua M. Leland, Orange, CT (US); Christopher Stathis, Somerville, MA (US); Brigid A. Blakeslee, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 15/336,125

(22) Filed: Oct. 27, 2016

(65) Prior Publication Data
US 2017/0116867 A1  Apr. 27, 2017

Related U.S. Application Data

(60) Provisional application No. 62/246,722, filed on Oct. 27, 2015.

(51) Int. Cl.
*G08G 5/04* (2006.01)
*B64C 25/34* (2006.01)
(Continued)

(52) U.S. Cl.
CPC ............ *G08G 5/045* (2013.01); *B64C 25/34* (2013.01); *B64C 27/04* (2013.01); *B64D 45/08* (2013.01);
(Continued)

(58) Field of Classification Search
CPC ........ G08G 5/045; B64C 25/34; G01S 7/4808
See application file for complete search history.

(56) References Cited

U.S. PATENT DOCUMENTS 7,898,435 B2  3/2011  Rogers et al.
8,457,813 B2  6/2013  Hogstrom et al.
(Continued)

FOREIGN PATENT DOCUMENTS

WO  2013089535 A1  6/2013

OTHER PUBLICATIONS

Richard O. Duda, et al.,"Use of the Hough Transformation to Detect Lines and Curves in Pictures" ACM, vol. 15, No. 1 Jan. 1972, p. 1-18.
(Continued)

*Primary Examiner* — Basil T. Jos
(74) *Attorney, Agent, or Firm* — Cantor Colburn LLP

(57) ABSTRACT

A system and method for determining the distance between at least one point on a vehicle and at least one projected area off of the vehicle includes receiving, with a processor, sensor signals indicative of LIDAR data for the projected area off the vehicle; applying, with the processor, a linear estimation algorithm to filter out noise within the LIDAR data and define a surface plane for the projected area; evaluating, with the processor, the LIDAR data against a vehicle state model; determining, with the processor, the distance between the at least one point on the vehicle and the at least one projected area off the vehicle; and commanding a response in the vehicle controls.

17 Claims, 4 Drawing Sheets

(51) Int. Cl.
*G01S 7/48* (2006.01)
*B64D 45/08* (2006.01)
*G05D 1/10* (2006.01)
*B64C 27/04* (2006.01)
*G01S 17/93* (2006.01)

(52) U.S. Cl.
CPC .......... *G01S 7/4808* (2013.01); *G01S 17/933* (2013.01); *G05D 1/101* (2013.01)

(56) References Cited

U.S. PATENT DOCUMENTS

| | | |
|---|---|---|
| 8,744,126 B1 | 6/2014 | Rohrschneider |
| 8,996,207 B2 | 3/2015 | Goossen et al. |
| 9,141,113 B1 | 9/2015 | Ivanov et al. |
| 2011/0224840 A1 | 9/2011 | Vanek |
| 2012/0078451 A1* | 3/2012 | Ohtomo ............... B64C 39/024 701/15 |
| 2017/0001732 A1* | 1/2017 | Lim .................... G05D 1/0684 |

OTHER PUBLICATIONS

Martin A. Fischler, et al.,"Random Sample Consensus: A Paradigm for Model Fitting With Applications to Image Analysis and Automated Cartography" ISR International, Mar. 1980, p. 1-42.

P.J. Green, "Interatively Reweighted Least Squares for Maxmum Likelihood Estimation, and Some Robust and Resistant Alternatives" Royal Statistical Society, Blackwell Publishing, Mar. 2, 2011, p. 1-45.

* cited by examiner

LIDAR-BASED VEHICLE DISTANCE MEASUREMENT SYSTEM

CROSS REFERENCE TO RELATED APPLICATIONS

This application which claims benefit of U.S. Provisional Application No. 62/246,722 filed Oct. 27, 2015, the contents of which are incorporated herein by reference in their entirety.

BACKGROUND

The subject matter disclosed herein relates generally to the field of rotorcraft and, in particular, to a system and method for detecting the altitude of a rotorcraft.

DESCRIPTION OF RELATED ART

Historically, aircraft have relied on radar-based or barometric altimeters to determine aircraft altitude. The measurement of aircraft altitude can be critical to the performance and safe operation of the aircraft. Aircraft altitude is especially critical for unmanned aircraft where a pilot's skill and judgment are not available to overcome false readings from altitude measurement systems. Current altitude measurement systems have their limitations. Radar-based altimeters are only capable measuring the distance between a single-point on the aircraft to a single-point on the ground and often suffer from poor resolution issues. Barometric altimeters require knowledge of the air pressure or altitude relative to sea level of the landing zone and pressure readings could vary with weather. Barometric altimeters also do not take into account potential hazards below the aircraft such as buildings, trees, mountains or rocky terrain.

BRIEF SUMMARY

According to an aspect, a method for determining the distance between at least one point on a vehicle and at least one projected area off of the vehicle includes receiving, with a processor, sensor signals indicative of LIDAR data for the projected area off the vehicle; applying, with the processor, a linear estimation algorithm to filter out noise within the LIDAR data and define a surface plane for the projected area; evaluating, with the processor, the LIDAR data against a vehicle state model; determining, with the processor, the distance between the at least one point on the vehicle and the at least one projected area off the vehicle; and commanding a response in the vehicle controls.

In addition to one or more of the features described above, or as an alternative, further embodiments could include wherein the vehicle is an aircraft in flight.

In addition to one or more of the features described above, or as an alternative, further embodiments could include wherein the at least one projected area off of the aircraft is within a landing zone.

In addition to one or more of the features described above, or as an alternative, further embodiments could include wherein the at least one point on a vehicle is a landing gear.

In addition to one or more of the features described above, or as an alternative, further embodiments could include wherein the at least one projected area off of the vehicle includes a potential hazardous object.

In addition to one or more of the features described above, or as an alternative, further embodiments could include wherein the potential hazardous object is airborne, land-based or sea-based.

In addition to one or more of the features described above, or as an alternative, further embodiments could include a memory having instructions stored thereon that, when executed by the processor, cause the system to command a response in the vehicle controls.

In addition to one or more of the features described above, or as an alternative, further embodiments could include wherein the processor sends the distance between at least one point on the vehicle and at least one projected area off of the vehicle to the pilot who then commands a response in the vehicle controls.

According to another aspect, a system for the measurement of the distance between at least one point on a vehicle and at least one projected area off the vehicle includes a sensor system; a processor; and memory having instructions stored thereon that, when executed by the processor, cause the system to: receive sensor signals indicative of LIDAR data for the platform; apply a linear estimation algorithm to filter out noise within the LIDAR data and define a surface plane for the projected area; evaluate, with the processor, the LIDAR data against a vehicle state model; and determine, with the processor, the distance between a point on the vehicle and for a projected area off of the vehicle.

In addition to one or more of the features described above, or as an alternative, further embodiments could include wherein the vehicle is an aircraft in flight.

In addition to one or more of the features described above, or as an alternative, further embodiments could include wherein the at least one projected area off of the aircraft is within a landing zone.

In addition to one or more of the features described above, or as an alternative, further embodiments could include wherein the at least one point on a vehicle is a landing gear.

In addition to one or more of the features described above, or as an alternative, further embodiments could include wherein the at least one projected area off of the vehicle includes a potential hazardous object.

In addition to one or more of the features described above, or as an alternative, further embodiments could include wherein the potential hazardous object is airborne, land-based or sea-based.

In addition to one or more of the features described above, or as an alternative, further embodiments could include wherein the system is configured to command a response in the vehicle controls.

In addition to one or more of the features described above, or as an alternative, further embodiments could include wherein the processor is configured to send the distance between at least one point on the vehicle and at least one projected area off of the vehicle to the pilot who then commands a response in the vehicle controls.

Embodiments provide the technical effect measuring the altitude of a manned or unmanned aerial vehicle using LIDAR data to enable the safe landing of the vehicle.

Other aspects, features, and techniques of the disclosure will become more apparent from the following description taken in conjunction with the drawings.

BRIEF DESCRIPTION OF THE SEVERAL VIEWS OF THE DRAWINGS

The foregoing and other features, and advantages of the disclosure are apparent from the following detailed description taken in conjunction with the accompanying drawings in which like elements are numbered alike in the several FIGURES.

DETAILED DESCRIPTION

Embodiments describe a system and method for measuring the distance between at least one point on a vehicle and at least one projected area off the vehicle using LIDAR data to enable safe operation of the manned vehicle or an autonomous unmanned vehicle. In one embodiment the system and method may be used for measuring the altitude of a manned or unmanned aerial vehicle using LIDAR data to enable the safe landing of the vehicle. The embodiments utilize one or more algorithms that employ a filter which leverages real-time LIDAR scanner data of specific regions below the aircraft from potentially dense point cloud data.

Figure 1:
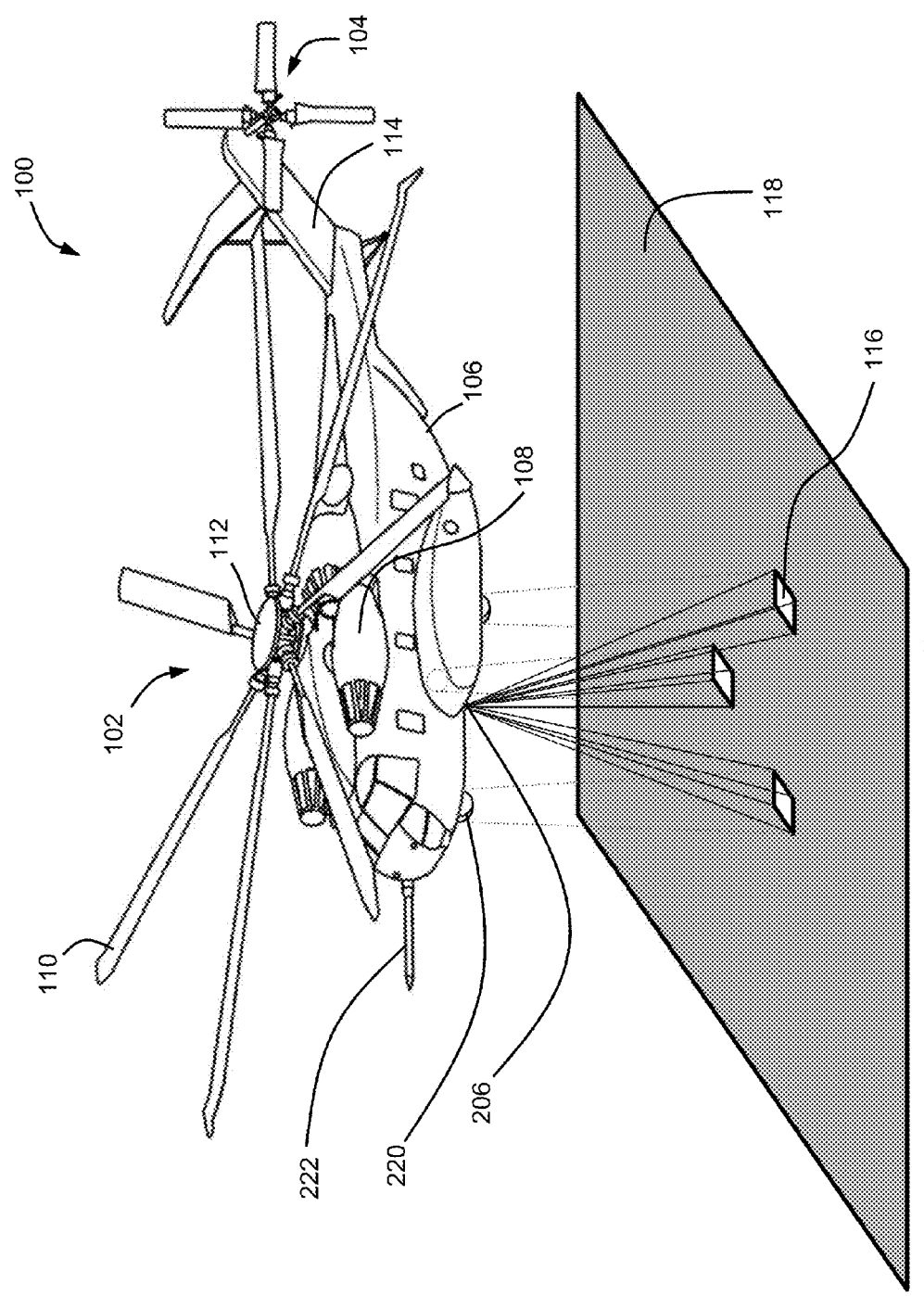
FIG. 1 illustrates an exemplary rotorcraft and LIDAR projection on a landing zone in accordance with an embodiment.

Referring now to the drawings, FIG. 1 illustrates a manned non-autonomous or an optionally piloted or unmanned autonomous rotary wing aircraft 100 (hereinafter "aircraft") which is moving into a position above a landing zone 118 in accordance with an embodiment. The aircraft 100 has a main rotor assembly 102, which is driven about an axis of rotation, via a main gearbox, by one or more engines 108. Main rotor assembly 102 includes multiple rotor blades 110 mounted to a rotor hub 112. The aircraft 100 includes an airframe 106 having an extending tail 114, which mounts a tail rotor system 104, such as an anti-torque system, a translational thrust system, a pusher propeller, a rotor propulsion system, or the like. The aircraft 100 includes landing gear 220 mounted to the airframe 106 in a tricycle configuration but may be mounted in a tail dragger, skid or any other landing gear configuration. The aircraft 100 also may include an inflight refueling probe 222. Although a particular aircraft 100 configuration is illustrated and described in the disclosed embodiment, other configurations and/or machines in various applications, such as high speed compound rotary wing aircraft with supplemental translational thrust systems, dual contra-rotating, coaxial rotor system aircraft, turbo-props, tilt-rotors, tilt-wing aircraft, automobiles, boats or other vehicle that would benefit from sensing using LIDAR the distance between points on the vehicle to points off the vehicle or specifically altitude.

Figure 2:
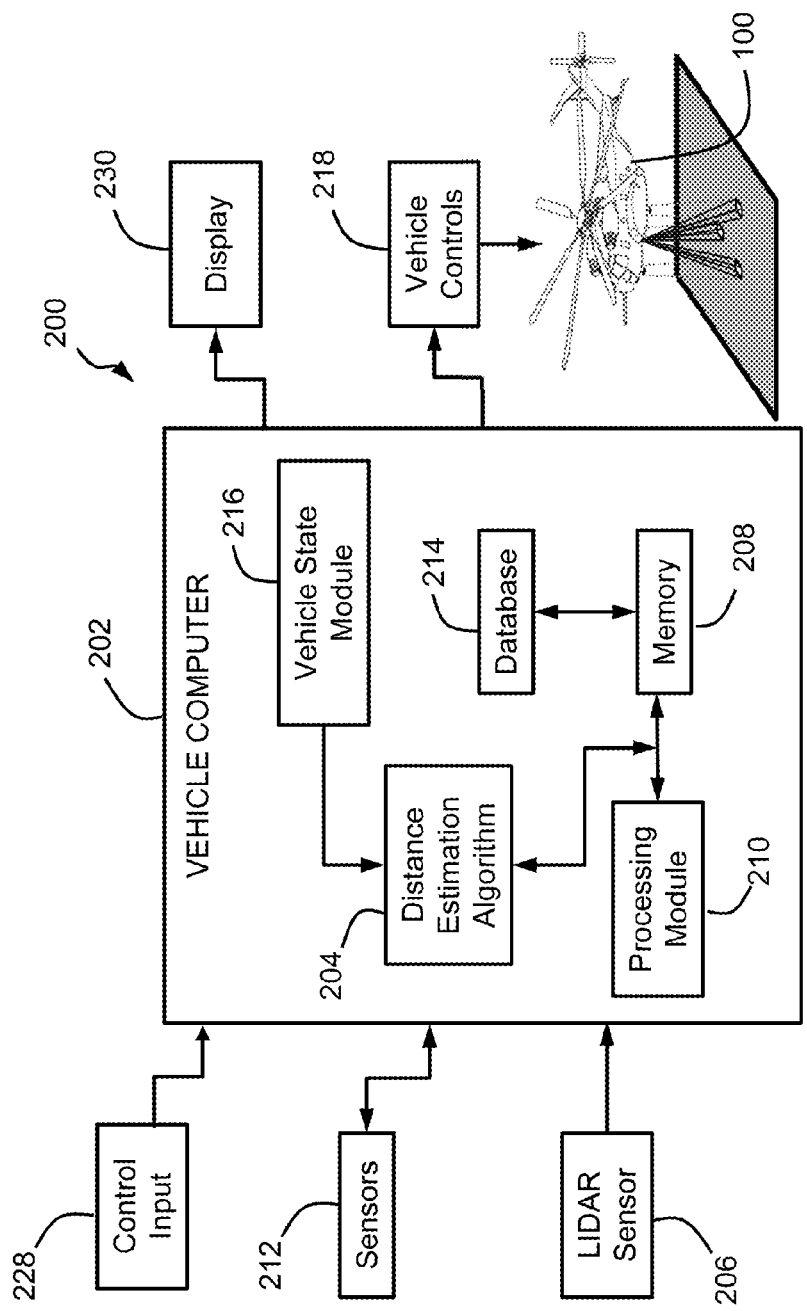
FIG. 2 is a schematic view of an exemplary computing system in accordance with an embodiment.

FIG. 2 illustrates a schematic block diagram of a control system 200 on board the aircraft 100 in accordance with an exemplary embodiment. As illustrated, control system 200 includes a vehicle computer 202 that executes instructions for implementing a distance estimation algorithm 204 for estimating the distance between points on the aircraft 100, for instance the landing gear 220, to points off the aircraft, such as a landing zone 118. The vehicle computer 202 can receive potentially dense three-dimensional ("3D") point cloud data of projected areas 116 on a landing zone 118 from a Light Detection And Ranging ("LIDAR") scanner 206, e.g., a VELODYNE® HDL-32E LIDAR scanner available from VELODYNE®, in order to implement the distance estimation algorithm 204. It is to be appreciated that extrinsic calibration parameters of LIDAR scanner 206 are known for transformations from the 3D sensor frame to the vehicle body coordinate frame. These parameters are stored in vehicle computer 202 within the vehicle state module 216. Other sensors 212 can include navigation systems such as global positioning systems ("GPS"), other global/inertial frame localization infrastructure, for example, an inertial measurement unit ("IMU") that can provide estimates to incremental changes in pose (e.g., position and orientation) of the aircraft 100, or sensors that can provide sensed parameters related to the aircraft's angular rate, attitude, acceleration rate, magnitude and direction of wind speed relative to aircraft 100, or the like.

The vehicle computer 202 includes a memory 208 that communicates with a processing module 210. The memory 208 stores a distance estimation algorithm 204 as executable instructions that are executed by the processing module 210. The instructions may be stored or organized in any manner and at any level of abstraction, such as in connection with the execution of the distance estimation algorithm 204. Also, in embodiments, the memory 208 may include random access memory (RAM), read only memory (ROM), or other electronic, optical, magnetic or any other computer readable medium onto which is stored the distance estimation algorithm 204.

The processing module 210 can be a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. In an embodiment, the processing module 210 can include a LIDAR processor in order to process the associated 3D point cloud data using one or more processing algorithms to produce one or more processed signals.

The control system 200 may include a database 214. The database 214 may be used to store inertial navigational data that may be acquired by IMU or GPS including pose estimates and operating conditions of the aircraft 100 such as, for example, lateral acceleration, attitude, and angular rate, magnitude, and direction of wind speed relative to the aircraft 100. Also, sensor data acquired by 3D-LIDAR, and/or any point cloud data that may be used by distance estimation algorithm 204 may be stored in database 214. Data stored in the database 214 may be based on one or more other algorithms or processes for implementing the distance estimation algorithm 204. For example, in some embodiments data stored in the database 214 may be a result of the processing module 210 having subjected data received from the LIDAR sensor 206 to one or more filtering processes. The database 214 may be used for any number of reasons. For example, the database 214 may be used to temporarily or permanently store data, to provide a record or log of the data stored therein for subsequent examination or analysis, etc.

The control system 200 may provide one or more controls, such as the vehicle controls 218. The vehicle controls 218 may provide flight control command signals required for flight augmentation of the aircraft 100 in order to land on a landing zone 118 (FIG. 1). Alternatively the control system 200 may provide the distance or altitude information to a pilot display 230 and the pilot will then command the aircraft to land via a control input 228 and vehicle controls 218.

The LIDAR data points are used to establish the ground plane of the aircraft's landing zone 118 as specific projected areas 116 below the landing gear 220. The LIDAR data points are focused on projected areas 116 within landing zone 118 to measure the distance between the ground and where the landing gear 220 are projected to touch down. Through the use of the distance estimation algorithm 204 and the vehicle state module 216, the vehicle computer 202 filters the LIDAR data to collect points located in the projected areas 116 to determine the distance between the projected areas 116 and any point of the aircraft 100. The distance estimation algorithm 204 includes algorithms that control the registration of LIDAR data points, the construction of surface plane for the projected areas 116 through a linear estimation algorithm, and the subsequent calculation of a distance between the chosen point on the aircraft and the centroid of the constructed (defined) surface plane of the projected areas 116. The vehicle state module 216 stores one or more aircraft models, depending on aircraft configuration and provides these to processing module 210. As the LIDAR data points are collected, a robust linear estimation algorithm within the distance estimation algorithm 204 will be used to process the data points to define a surface plane for each of the projected areas 116 and determine a measure from each projected areas 116 to a point or points on the aircraft 100. The linear estimation algorithm processes the LIDAR data points by filtering out noise through converging on an estimate for the surface plane of the projected areas 116. FIG. 1 shows that the projected areas 116 are slightly offset from the landing gear 220 to ensure visibility during descent as the landing gear 220 approach the landing zone 118. By defining these narrow projected areas 116 on the ground plane of the landing zone 118, the aircraft computer could focus computing power on the areas of importance within the landing zone 118 to facilitate a safe landing. In one embodiment the vehicle computer 202 could relay the altitude of the landing gear 220 via a display 230 to the pilot, who could adjust the aircraft 100, whereas in another embodiment the vehicle computer 202 will send commands directly to the vehicle controls 218 to automatically adjust the orientation of the aircraft 100 to enable a safe landing.

Figure 3:
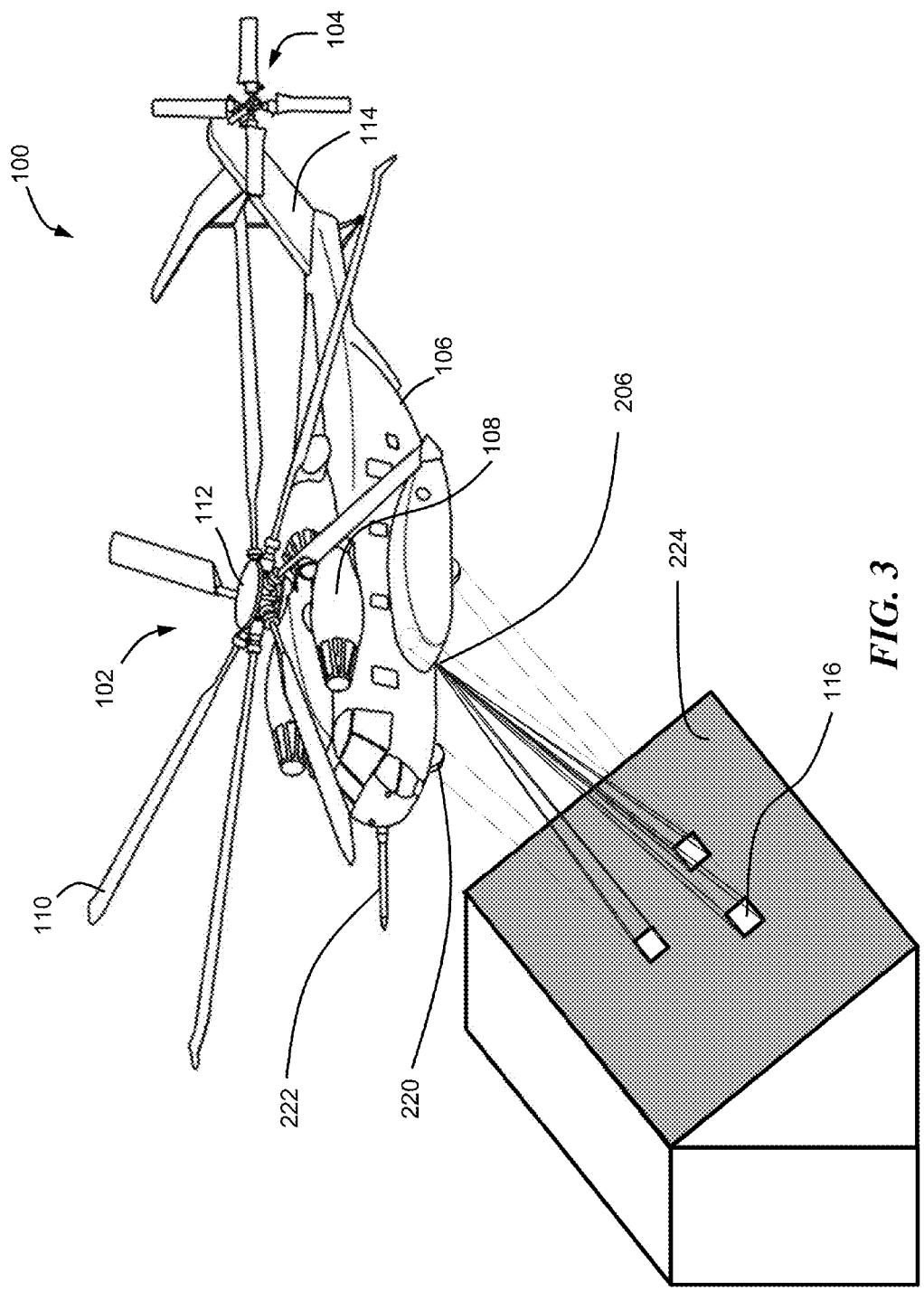
FIG. 3 illustrates an exemplary rotorcraft and LIDAR projection on a sloped landing zone in accordance with an embodiment.

Additional functionalities for this LIDAR-based processing technique could include forming a single mesh/plane from the three planes found on the landing site below each wheel or could yield greater feedback and control potential when landing on uneven terrain. In one embodiment, as seen in FIG. 3, the LIDAR sensor 206 may be used to detect the slope of a projected area 116 and distance to the landing gear 220, to adjust the aircraft and enable the aircraft 100 to land on sloped landing zone 224. In one embodiment, the slope of the sloped landing zone 224 is detected, the vehicle computer 202 could relay the angle of the sloped landing zone 224 via a display 230 to the pilot, who could then adjust the aircraft 100, whereas in another embodiment the vehicle computer 202 will send commands directly to the vehicle controls 218 to automatically adjust the orientation of the aircraft 100 to enable a safe landing on the sloped landing zone 224.

Figure 4:
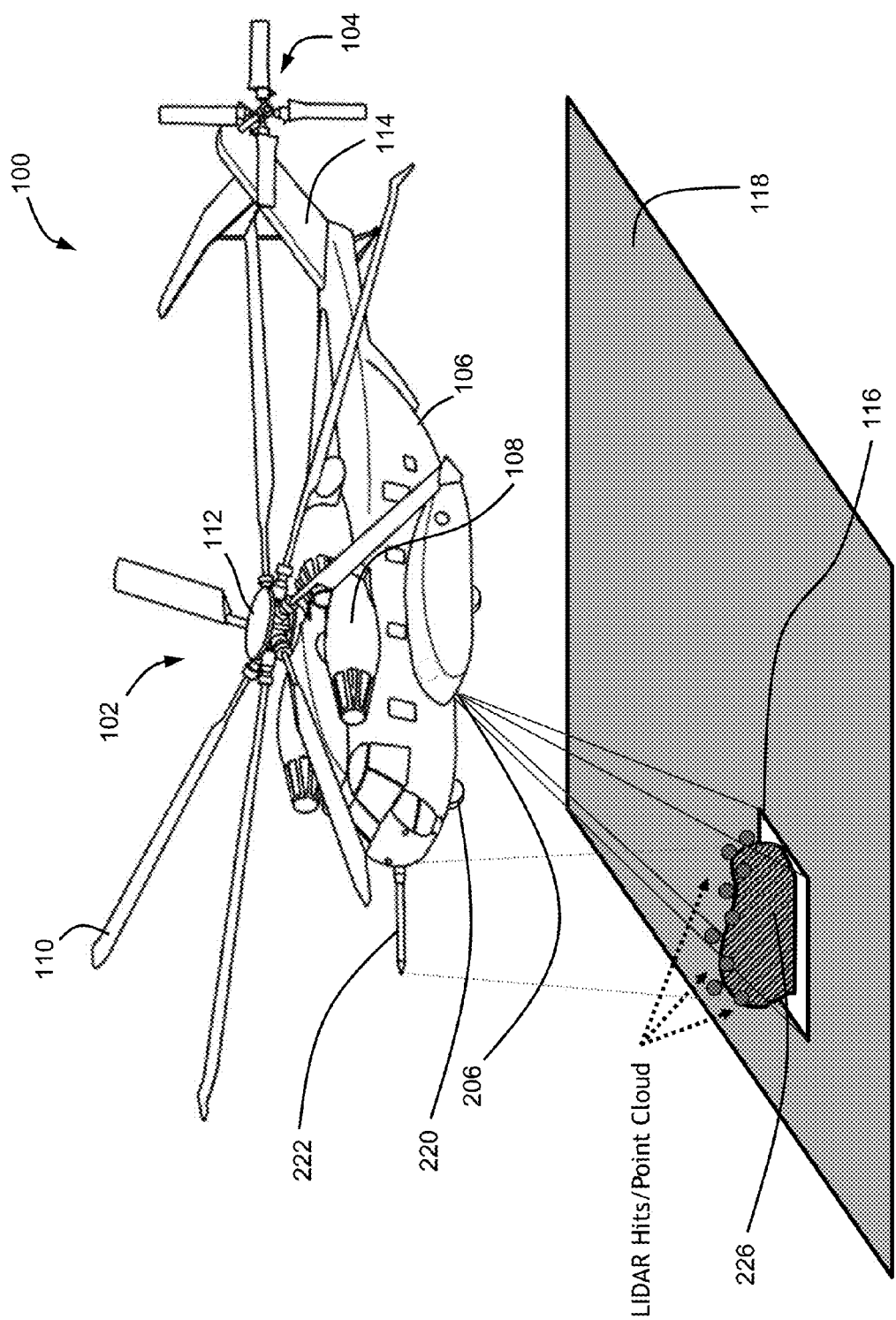
FIG. 4 illustrates an exemplary rotorcraft and LIDAR projection on landing zone that contains a hazardous object in accordance with an embodiment.

Further, this altitude detection use of LIDAR is not limited to the landing gear 220 but may be used to determine the altitude of any point on the aircraft 100. In one embodiment, as seen in FIG. 4, the LIDAR sensor 206 may be used to detect and avoid potential hazardous objects 226 within the landing zone 118 that may impact various points on the aircraft 100, like the inflight refueling probe 222. In one embodiment, once a potential hazardous object 226 is detected, the vehicle computer 202 could relay the warning via a display 230 to the pilot, who would then adjust the aircraft 100, whereas in another embodiment the vehicle computer 202 will send commands directly to the vehicle controls 218 to automatically adjust the orientation of the aircraft 100 to enable a safe landing and avoid the potential hazardous object 226. The LIDAR sensor 206 may also be used to sense distance between points on the aircraft 100 (or other vehicles) and other flying objects (airborne), land-based objects, or sea based-objects that may be a potential collision hazard and relay that information to the pilot or directly to the vehicle controls 218.

In one embodiment the robust linear estimation algorithm is a Random Sample Consensus ("RANSAC") algorithm. RANSAC offers robustness and reliability, discarding points determined to be erroneous and outliers of the actual plane we are considering. In other embodiments the robust linear estimation algorithm may be an Iteratively Reweighted Least Squares ("IRLS") algorithm or a Hough Transform algorithm to recover the dominant, linear/planar feature in each scene. In embodiments, the IRLS algorithm is applied according to the method disclosed in a non-patent literature publication authored by Patrick J. Green, entitled "Iteratively reweighted least squares for maximum likelihood estimation, and some robust and resistant alternatives" (*Journal of the Royal Statistical Society, Series B(Methodological)*: 149-192, 1984), the RANSAC algorithm is applied according to the method disclosed in a non-patent literature publication authored by Martin A. Fischler et al., entitled "Random Sample Consensus: a Paradigm for Model Fitting with Applications to Image Analysis and Automated Cartography" (*Communications of the ACM* 24 (6): 381-395), and the Hough Transform algorithm is applied according to the method disclosed in a non-patent literature publication authored by R. O. Duda et al., entitled "Use of the Hough Transformation to Detect Lines and Curves in Pictures," *Communications of the ACM Vol.* 15, pp. 11-15 (Jan. 1972), which are herein incorporated by reference. In an embodiment, the IRLS algorithm is applied to the set of points using a linear model for a fixed number of iterations or until convergence. Sample weights may be defined as a function of each point's proximity (e.g., orthogonal distance) to the linear deck surface estimate from a previous IRLS iteration as well as its range from the LIDAR sensor. Intuitively, the closer a point is to the LIDAR sensor and the previous altitude estimate, then the more weight it will receive. To prevent divergence, the IRLS solution may be biased (e.g., via a regularization) towards the horizontal plane at the expected height of the ship above sea level.

The terminology used herein is for the purpose of describing particular embodiments only and is not intended to be limiting of the disclosure. While the description of the present disclosure has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope of the disclosure. Additionally, while the various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method for determining the distance between at least one point on a vehicle and at least one projected area off of the vehicle, comprising:
receiving, with a processor, sensor signals indicative of LIDAR data for the projected area off the vehicle;

applying, with the processor, a linear estimation algorithm to filter out noise within the LIDAR data and define a surface plane for the projected area;
evaluating, with the processor, the LIDAR data against a vehicle state model;
determining, with the processor, the distance between the at least one point on the vehicle and a centroid of the at least one projected area off the vehicle; and
commanding a response in the vehicle controls.

2. The method of claim 1, wherein the vehicle is an aircraft in flight.

3. The method of claim 2, wherein the at least one projected area off of the aircraft is within a landing zone.

4. The method of claim 3, wherein the at least one point on a vehicle is a landing gear.

5. The method of claim 1, wherein the at least one projected area off of the vehicle includes a potential hazardous object.

6. The method of claim 5, wherein the potential hazardous object is airborne, land-based or sea-based.

7. The method of claim 1, further comprising a memory having instructions stored thereon that, when executed by the processor, cause the system to command a response in the vehicle controls.

8. The method of claim 1, wherein the processor sends the distance between at least one point on the vehicle and at least one projected area off of the vehicle to the pilot who then commands a response in the vehicle controls.

9. A system for the measurement of the distance between at least one point on a vehicle and at least one projected area off the vehicle, comprising:
a sensor system;
a processor; and
memory having instructions stored thereon that, when executed by the processor, cause the system to:
receive sensor signals indicative of LIDAR data for the at least one projected area off the vehicle;
apply a linear estimation algorithm to filter out noise within the LIDAR data and define a surface plane for the projected area;
evaluate, with the processor, the LIDAR data against a vehicle state model; and
determine, with the processor, the distance between a point on the vehicle and a centroid of the projected area off of the vehicle.

10. The system of claim 9, wherein the vehicle is an aircraft in flight.

11. The system of claims 10, wherein the at least one projected area off of the aircraft is within a landing zone.

12. The system of claim 11, wherein the at least one point on a vehicle is a landing gear.

13. The system of claim 9, wherein the at least one projected area off of the vehicle includes a potential hazardous object.

14. The system of claim 13, wherein the potential hazardous object is airborne, land-based or sea-based.

15. The system of claim 9, wherein the system is configured to command a response in the vehicle controls.

16. The system of claim 9, wherein the processor is configured to send the distance between at least one point on the vehicle and at least one projected area off of the vehicle to the pilot who then commands a response in the vehicle controls.

17. A method for determining the distance between at least one point on a vehicle and at least one projected area off of the vehicle, comprising:
receiving, with a processor, sensor signals indicative of LIDAR data for the projected area off the vehicle;
applying, with the processor, a linear estimation algorithm to filter out noise within the LIDAR data and define a surface plane for the projected area, wherein the linear estimation algorithm is a random sample consensus algorithm;
evaluating, with the processor, the LIDAR data against a vehicle state model;
determining, with the processor, the distance between the at least one point on the vehicle and a centroid of the at least one projected area off the vehicle; and
commanding a response in the vehicle controls.

* * * * *